(12) United States Patent
Kahles

(10) Patent No.: US 6,766,273 B2
(45) Date of Patent: Jul. 20, 2004

(54) METHOD FOR DETERMINING THE REMAINING RUNNING TIME A DRIVE RUNS

(75) Inventor: Patric Kahles, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,961

(22) PCT Filed: Mar. 23, 2001

(86) PCT No.: PCT/DE01/01121

§ 371 (c)(1),
(2), (4) Date: Mar. 15, 2002

(87) PCT Pub. No.: WO01/75536

PCT Pub. Date: Oct. 11, 2001

(65) Prior Publication Data

US 2002/0107662 A1 Aug. 8, 2002

(30) Foreign Application Priority Data

Mar. 30, 2000 (DE) .......................................... 100 15 856

(51) Int. Cl.[7] .............................................. G04F 10/04

(52) U.S. Cl. ...................................... 702/177; 702/176

(58) Field of Search ........................... 702/94, 95, 125, 702/177, 176; 318/265, 266, 428, 434, 445, 447, 452, 456, 468, 469, 465, 560, 599, 603, 626, 663; 324/160; 327/141; 341/11; 700/56

(56) References Cited

U.S. PATENT DOCUMENTS

| | | | | |
|---|---|---|---|---|
| 3,612,976 A | * | 10/1971 | Tripp | .......................... 318/603 |
| 4,312,033 A | * | 1/1982 | Sweeney et al. | .............. 700/56 |
| 4,468,063 A | * | 8/1984 | Yukimoto et al. | |
| 4,578,748 A | * | 3/1986 | Abe et al. | ..................... 700/56 |
| 4,808,894 A | * | 2/1989 | Mizuta | ....................... 318/266 |
| 4,931,714 A | * | 6/1990 | Yamamoto | ................... 318/663 |
| 4,965,502 A | * | 10/1990 | Ogasawara | ................. 318/628 |
| 5,098,152 A | * | 3/1992 | Sakai | |
| 5,184,050 A | * | 2/1993 | Harada et al. | |
| 5,197,779 A | * | 3/1993 | Mizuno et al. | |
| 5,233,279 A | * | 8/1993 | Matsubara | .................. 318/560 |
| 5,372,401 A | * | 12/1994 | Odoi et al. | |
| 5,592,777 A | * | 1/1997 | Petri et al. | |
| 5,608,394 A | * | 3/1997 | Hirabayashi | ................. 341/11 |
| 5,705,755 A | * | 1/1998 | Yamamura | |
| 5,723,959 A | * | 3/1998 | Iwata et al. | ................. 318/447 |

(List continued on next page.)

FOREIGN PATENT DOCUMENTS

| | | | | |
|---|---|---|---|---|
| DE | 38 29 405 A | 3/1990 | | |
| DE | 196 10 626 A | 9/1997 | | |
| DE | 197 02 931 C | 7/1998 | | |
| EP | 0043733 | * | 7/1981 | ............ G05D/3/20 |
| EP | 0 047 812 A | 3/1982 | | |
| EP | 0 603 506 A | 6/1994 | | |

OTHER PUBLICATIONS

Pasanen, J; Vaino, O; Tenhunen, H; Jahkonen, P; Ovaska, S;"An ASIC Digital Motion Control Unit"; Proceedings 3rd Annual IEEE ASIC Seminar And Exhibit; Sep. 1990; P7/2.1–P7/2.4.*

Primary Examiner—John Barlow
Assistant Examiner—Douglas N Washburn
(74) Attorney, Agent, or Firm—Michael J. Striker

(57) ABSTRACT

The invention is based on a method for determining the remaining running time of an electric drive mechanism until a mechanical limit stop has been reached, wherein surfaces to be closed are moved into mechanically limited end positions by means of the drive mechanism. After the position of the surface to be closed is detected relative to a mechanical limit stop, the time difference between two incremental pulse generators 25 near the limit stop is determined, and the remaining running time 26 of the electric drive mechanism until the mechanical limit stop is reached is calculated.

10 Claims, 3 Drawing Sheets

U.S. PATENT DOCUMENTS

| | | | |
|---|---|---|---|
| 5,723,960 A | * | 3/1998 | Harada |
| 5,786,675 A | * | 7/1998 | Niki et al. |
| 5,793,173 A | * | 8/1998 | Henschel et al. ........... 318/467 |
| 5,808,250 A | * | 9/1998 | Torii et al. |
| 6,031,348 A | * | 2/2000 | Fehr et al. .................. 318/283 |
| 6,064,165 A | * | 5/2000 | Boisvert et al. ............ 318/465 |
| 6,081,088 A | * | 6/2000 | Ishihara et al. |
| 6,225,769 B1 | * | 5/2001 | Brenner et al. .............. 318/434 |
| 6,239,610 B1 | * | 5/2001 | Knecht et al. .............. 324/772 |
| 6,297,606 B1 | * | 10/2001 | Yoshioka et al. |
| 6,320,342 B1 | * | 11/2001 | Yoshioka et al. |
| 6,404,084 B1 | * | 6/2002 | Niki et al. ................. 310/75 R |
| 6,424,109 B2 | * | 7/2002 | Ochiai et al. ................ 318/445 |
| 6,541,930 B1 | * | 4/2003 | Gutierrez .................... 318/437 |

* cited by examiner

METHOD FOR DETERMINING THE REMAINING RUNNING TIME A DRIVE RUNS

BACKGROUND OF THE INVENTION

The invention is based on a method for determining the remaining running time of a drive mechanism until an end position is reached. In power adjusting systems such as window lifters or sunroof controls in motor vehicles, a secure closing of a surface such as a glass surface must be ensured.

To move glass surfaces in motor vehicles, whether they be windows or sunroofs, power adjusting systems such as window lifter drive mechanisms are generally used. A secure closing of the window surfaces is to be ensured by means of these drive mechanisms in order to protect the passenger cell of a motor vehicle against theft and break-in. The closing system containing window surfaces is run to its mechanically limited end position when closed. A detection of low speed, torques or current usually serves as the criterium for shutoff. In window lifter systems, the transition from window pane to door frame is closed by means of an appropriate seal. Upon immersion in the seal, the friction usually increases, so that the motor torque increases as a result of this. In window lifter systems that do not include an early shutoff at the upper limit stop, the closing system can twist in the upper seal.

To ensure a secure closing, the limit values of the mechanical load of the respective components must be selected appropriately high, however. High mechanical limit values permit a high mechanical loading of the components used, such as window lifters, sliding-door guides; motors, etc., with the result that their dimensioning is synchronized with the limit values that occur, and the resultant wear and tear is to be rated as relatively high.

In window lifter systems, the upper limit stop with closing force limitation is advantageously used as the reference position. Based on the reference position, important data such as protected range limits of the closing system are calculated. By repeatedly approaching the actual upper limit stop, this reference position is constantly corrected within certain tolerances. Changes that occur in the mechanical system are detected and taken into account in this fashion.

SUMMARY OF THE INVENTION

In attaining the object of the invention of calculating—depending on the position of the closing surfaces—the remaining running time of a drive mechanism until the final closing position is reached, the mechanical load of the closing system can be reduced considerably. When window panes are raised, e.g., into their closed positions on a motor vehicle door or the like, a twisting of the window surface, e.g., in the seal assigned to this, can take place. This twisted state can last until the next control procedure of the electric drive mechanism and can possibly be exacerbated even further by strong solar radiation to which the closing system in a motor vehicle can be subjected. In attaining the object of the invention, the window pane is moved into a closing position, for example, that takes this actual, system-related change of the mechanical limit stop limiting the closing procedure into account, so that, starting in a detected position, the remaining running time of the electric window lifter drive mechanism can be adjusted exactly to the position of the facing mechanical limit stop before excessive torques and forces of pressure can act on the mechanical components transferring the forces. In attaining the object of the invention, the mechanically-induced system twisting can be reduced significantly, resultant forces and torques can be reduced considerably, because the closing position is reached sooner. Accompanying this is a considerable increase in continuous operational stability; moreover, bearings, spindles, mechanical components transferring the motion can be dimensioned much lighter, because much lower limit values can now be selected thanks to the intelligent drive mechanism shutoff.

If the attaining of the object of the invention for determining the remaining running time is used in a window lifter drive mechanism of a motor vehicle, this can be used to increase the comfort of the vehicle passengers, because a noise reduction can be achieved when the closed position of the respective window or sunroof surface is reached.

An Increase in the thermal motor availability is achieved by means of the timely shutoff of the electric drive mechanism; it can be effectively prevented from overheating as a result of excess current.

Due to the fact that system-related changes such as weather factors or the motor voltage on the electric drive mechanism are taken into account, a change in the depth of immersion resulting from this can be offset by means of changing actual positions of the upper limit stop. When the actual position of the mechanical limit stop travels upward, the window pane is moved past the old stop position due to the kinetic energy of the window lifter system after the drive mechanism is shut off and therefore reaches the current, actual limit stop.

If, on the other hand, the actual limit stop moves downward, the position at which the measurement is triggered is not reached, and a shutoff of the electric drive mechanism based on the principle of remaining running time cannot take place; instead, a standardization by means of setting a reference point is forced.

BRIEF DESCRIPTION OF THE DRAWINGS

The invention will be described in detail below using the drawings.

DETAILED DESCRIPTION OF THE PREFERRED EMBODIMENTS

Figure 1:
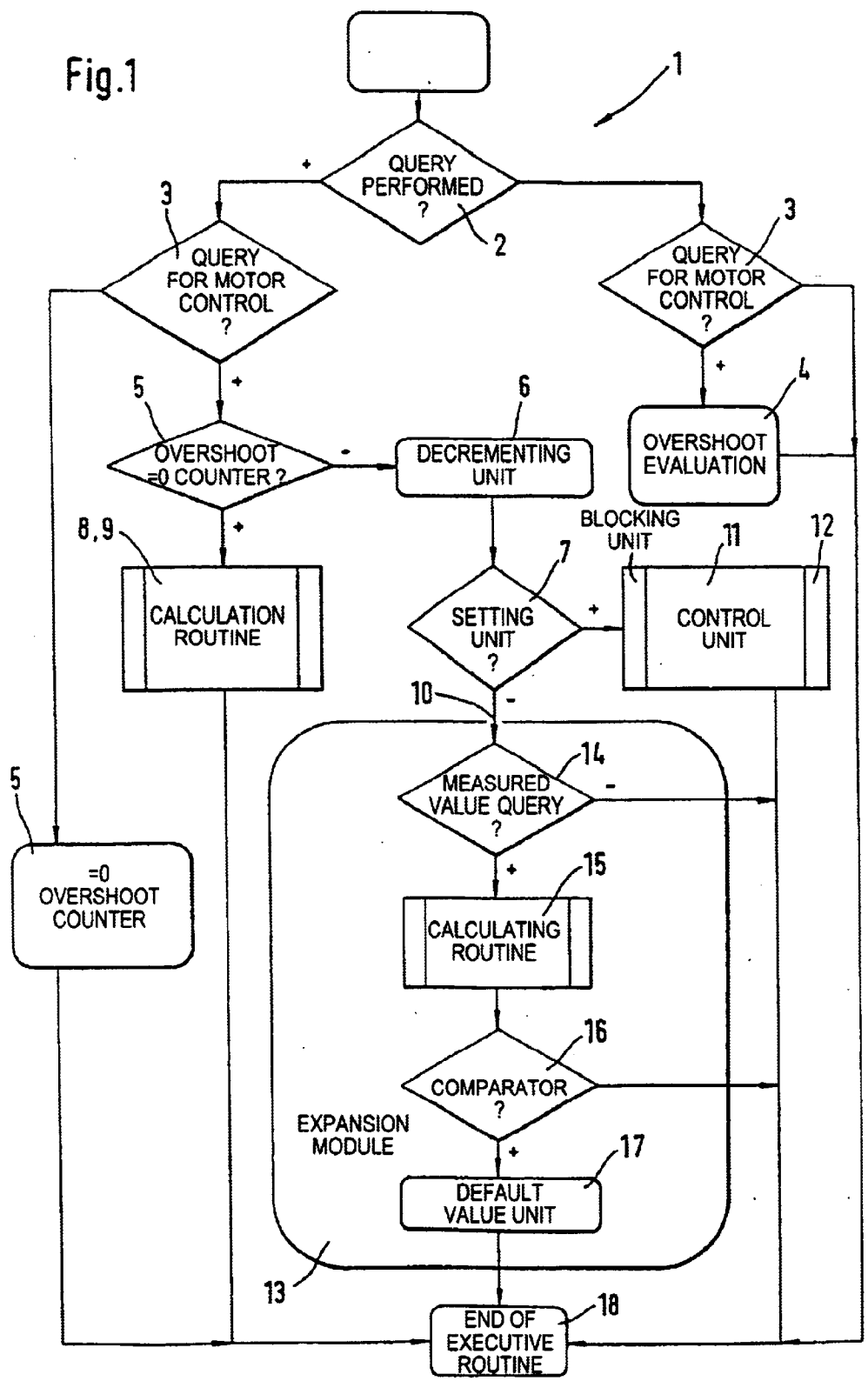
FIG. 1 shows an executive routine for the cyclic determination and storage of remaining running times of electric drive mechanisms.

In the presentation according to FIG. 1, an executive routine for the cyclic determination and storage of remaining running times for electric drive mechanisms is shown.

In the multi-branching executive routine 1 for the cyclic determination of remaining running times for electric drive mechanisms, e.g., for window lifters or sunroofs, a query 2 is first performed to determine if the overshoot range has been reached. Depending on the free capacity of a microprocessor, the executive routine 1 is called up and executed; as an option, it can contain an expansion module 13. After determining whether the position of the window pane in the overshoot range still lies within an overshoot range, if the answer to this question is "yes", then a branching off to the query 3 for motor control takes place, and a query also takes place about the availability of the overshoot evaluation. If the drive mechanism for moving the pertinent surface to be closed is inactive, and the routine for the overshoot evaluation is free, a branching off to the overshoot counter 5—which is set to the value 0—takes place; from there, a branching off to the end 18 of the cyclic executive routine 1 then takes place until this is called up by the microprocessor or the microcontroller. The call cycles by the microprocessor depend on its remaining capacity.

If, at the position detection 2 of the pertinent window or glass pane, it is determined that the current position of the pertinent window pane lies outside the overshoot range, a branching off to a second query 3 takes place, to whether the "lift" motor control is active. If the answer to this question is "no", a branching off to the end 18 of the executive routine 1 takes place, which is processed in cyclical fashion by the microcontroller. If it is determined by the query 3 that the drive mechanism for moving the window pane into the closing position is active, however, a branching off to the overshoot evaluation 4 takes place, and the overshoot counter is set to 0. From there, a branching off to the end 18 of the executive routine 1 takes place again.

After the first aforementioned query 3 for the motor control, if motor control is active and overshoot evaluation is free, the overshoot counter 5 arranged after it is queried as to whether its value=0. Since the current position of the window pane lies in the overshoot range according to the query in the position detection 2, if the answer to the query regarding the value 0 of the overshoot counter 5 is "yes", the overshoot time of the electric drive mechanism is calculated. The calculated value is increased by 1 and loaded into the overshoot counter. After the calculation routine 8, 9 is performed, a branching off to the end of the executive routine 1 to be performed in cyclical fashion takes place again.

If the query of the overshoot counter 5 regarding the presence of the value 0 is "no", however, the overshoot counter 5 is decremented; in the overshoot counter setting unit 7, the overshoot counter is set to the value 1. A control of the shutoff of the electric drive mechanism of the window surface to be closed, e.g., a window pane or a sunroof, takes place; moreover, the overshoot evaluation is blocked. From there, a branching off to the end of the executive routine 1 takes place.

If the query regarding the overshoot counter value=0 is "no", a branching off can take place from the overshoot counter setting unit 7 to an expansion module 13. This is an optionally available evaluation and can be left out in a standard configuration of the detection routine and turned off by the parameter overshoot control=0. If the expansion module 13 is activated, however, a measured value query 14 is performed to ask whether a new measured value is present, which can be determined via a sensor, for example. If a new measured value is not available, a branching off to the end 18 of the cyclic executive routine 1 takes place. If a new measured value is present, however, the overshoot control time plus 1 is calculated within a calculating routine 15. In the subsequent comparator 16 it is determined whether the control time exceeds the overshoot time; if not, a branching off to the end 18 of the course of the executive routine 1 to be carried out in cyclic fashion takes place. If the control time exceeds the overshoot counter time, the overshoot counter is set to a control time in a default value unit 17.

Figure 2:
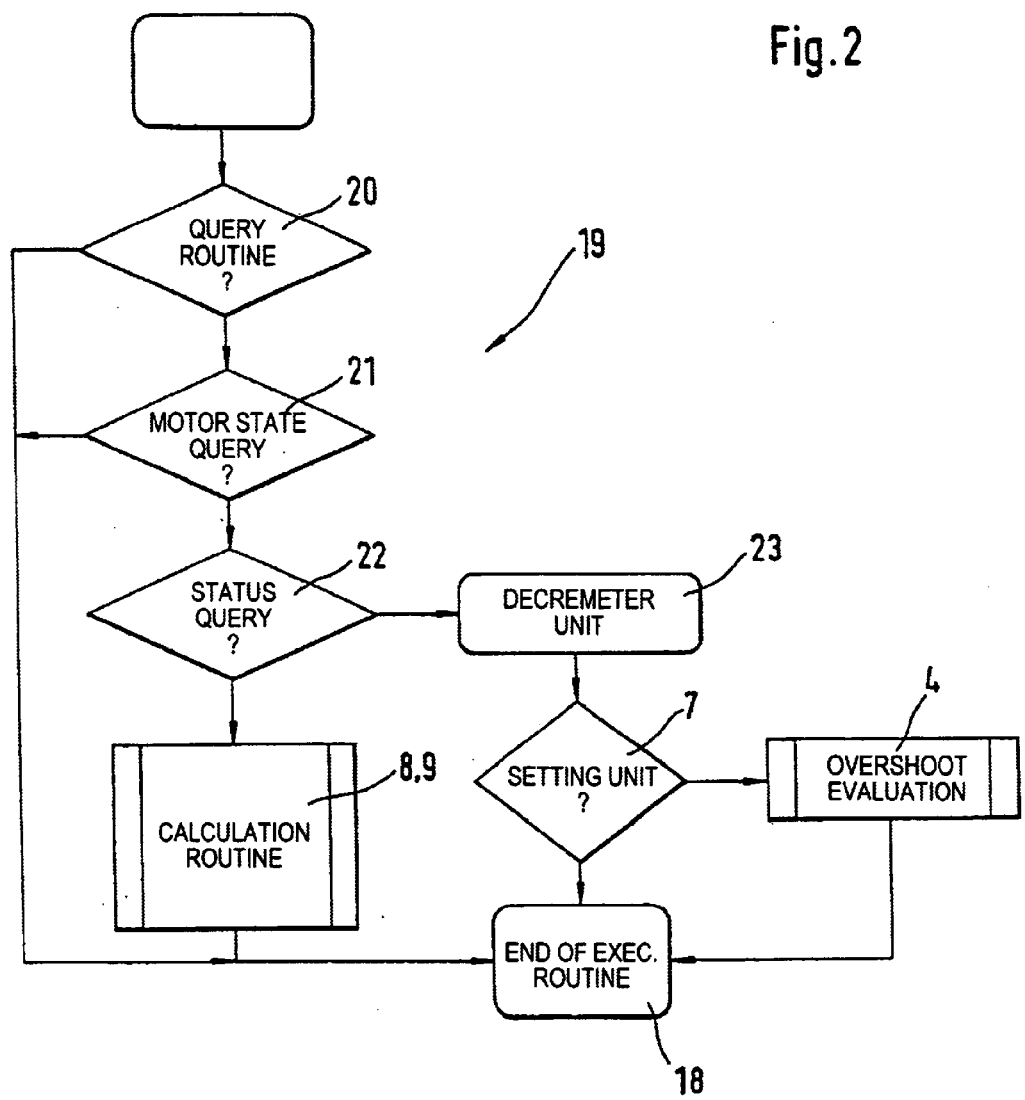
FIG. 2 shows an executive routine for determining a defined overshoot.

FIG. 2 shows an executive routine for the defined determination of an overshoot.

Based on a start block, it is determined within a query routine 20 whether the overshoot range has been reached or not; if not, a branching off to the end of the executive routine 19 for defined overshoot takes place. If the overshoot range has been reached, however, a subsequent motor state query 21 is performed to determine whether the electric drive motor is turned on or not. If not, a branching off to the end 18 of the routine 19 takes place. It is determined within an query 22 whether the overshoot counter status has the value 0. If so, the overshoot time is calculated in the calculation routine 8, 9; the determined value is increased by 1 and loaded into the overshoot counter 5. From the overshoot counter status query 22, a branching off to a decrementer unit 23 takes place, which sets the overshoot counter 5 to the value 1. If the overshoot counter has the value 1, a control of the electric drive mechanism for the pane to be closed takes place to shut-down, and from there, a branching off to the end 18 of the executive routine 19 for defined overshoot takes place.

A decrementing unit 6 decrements the counting unit 5 if the actual value of the counting unit 5 is not 0. A control 11 for the drive of the window or sunroof stops the drive after expiration of the determent remaining runtime 26. A blocking unit 12 is assigned to the respective control unit 11 of the drive of the window. This unit is assigned to the control unit 11 blocking the calculation of the remaining runtime 26 after the drive has stooped.

Figure 3:
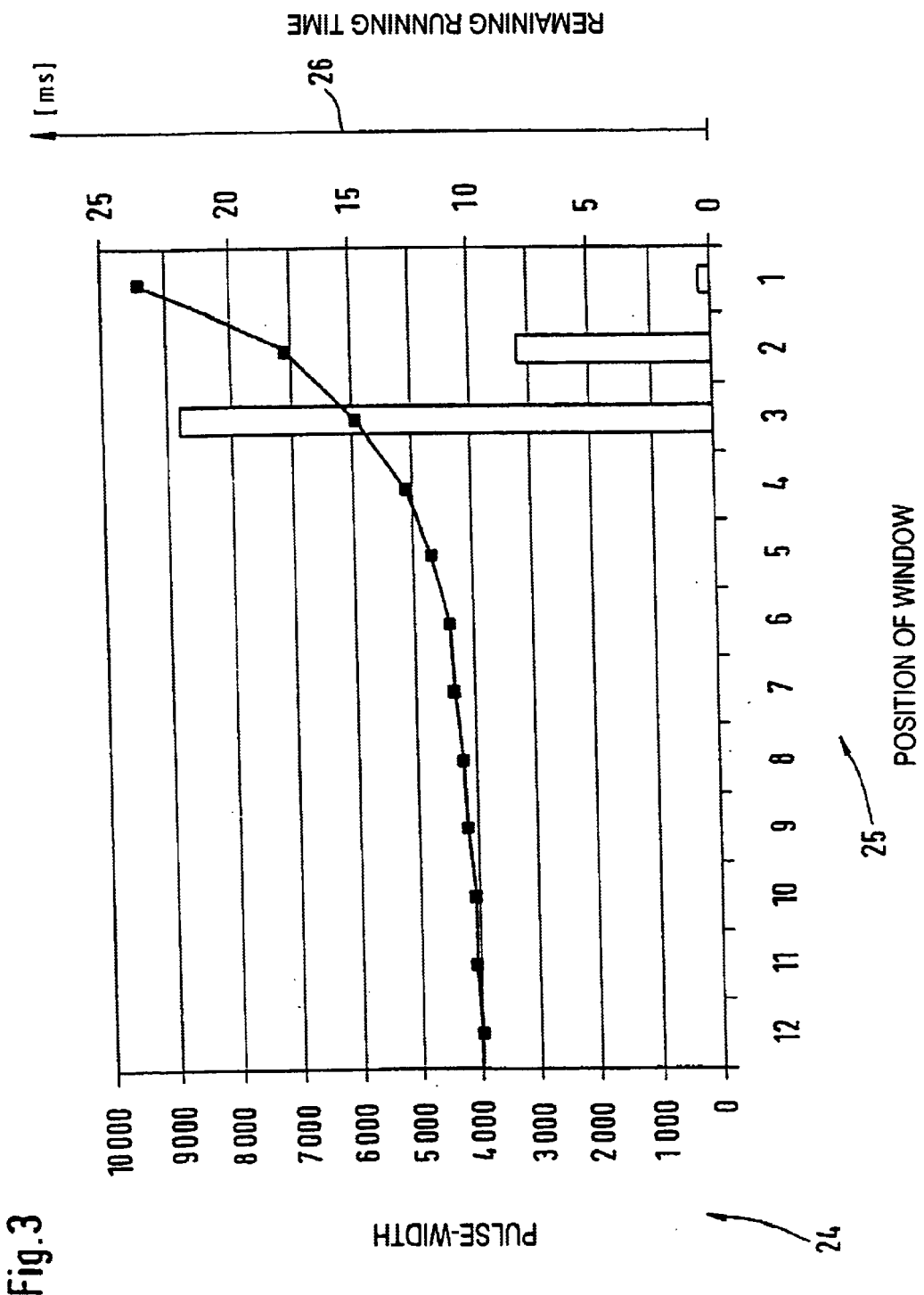
FIG. 3 shows a bar chart with depiction of the position of the window pane used to determine the remaining running time, as well as its course.

FIG. 3 shows a bar chart with depiction of the position of the window pane to be closed, for the closing of which the remaining running time is determined.

The overshoot time for the Postion 3 is determined from the relationship $$t_{remaining}=(2-0) \cdot t_{Delta}, \text{ 2=measuring position}$$

Position 2 thereby represents the measuring position, and Position 0 represents the upper limit stop. In the example shown, the overshoot time is calculated at Position 3, after the counter 5 runs its course in Position 1, the electric drive motor is shut down according to Position 11 of FIGS. 1 and 2. A blocking is thereby prevented, the electric drive mechanism comes to a stop anyway in a securely closed position of the window pane.

If the remaining running time $t_{remaining}$ is determined, the overshoot time $t_{overshoot}$ can be determined by means of multiplication with an additional factor. The additional factor can be set depending on the measuring position determined. An empirical determination from reference runs is also possible. The respective electric drive mechanism is shut down after the overshoot time $t_{overshoot}$ determined in this fashion elapses, by way of which a twisting of the surface to be closed at the upper specified mechanical limit stop can be prevented. The overshoot time is determined according to the relationship $$t_{overshoot}=t_{remaining} \cdot \text{additional factor}$$

A variation of the measuring position makes it necessary to adjust the additional factor. To verify the position of an actual upper limit stop or to offset mechanical system inaccuracies, the respective upper limit stop can be approached cyclically or anti-cyclically. The motor can thereby be controlled up to the blocking, for example, and the position assumed can then be set to 0. The cycle to be performed in each case can be determined by means of a characteristic line or at random.

Due to changes occurring due to the system, e.g., the ambient temperatures as a result of a longer effect of solar radiation or changes in motor voltage in the electric drive motor, the depth of immersion of a window pane in a seal, for example, can vary. The depth of immersion increases, for example, when the actual upper mechanical limit stop moves and, in fact, when it moves upward. Due to the kinetic energy of the window lifting system, the window pane is moved past the old stop position after the electric drive motor shuts off, and it moves in the direction of its actual limit stop. In the reverse case, in which the immersion depth decreases, the actual mechanical limit stop moves downward. The measuring position (Position 2 in the equation for $t_{remaining}$ is now not reached; a shutoff by means of the principle of remaining time presented here therefore does not take place. A standardization is forced instead.

The reference point position (Position 0 in the equation for $t_{remaining\ time}$) is set. The next time the upper block is started, the measuring position is reached again, and the shutoff of the electric drive motor can now be determined based on the determined calculation of the respective remaining running time required, which serves to assume a closing position.

LIST OF REFERENCE NUMBERS

1. Cyclic executive routine
2. Position detection
3. Motor control query
4. Overshoot evaluation
5. Overshoot counter
6. Decrementer
7. Overshoot counter setting unit
8. Calculation routine
9. Loading routine
10. Current evaluation position
11. Drive mechanism shutoff control
12. Evaluation blocking
13. Expansion module
14. Measured value query
15. Calcuating routine overshoot/control time
16. Comparator
17. Overshoot setter
18. End
19. Executive routine defined overshoot
20. Range query
21. Motor state query
22. Overshoot counter status
23. Decrementer
24. Pulse width
25. Position drive mechanism/closing surface
26. Overshoot time

What is claimed is:

1. A method for determining a remaining running time of an electrical drive mechanism until a limit stop is reached, wherein said drive mechanism moves a window or sunroof to be closed to a mechanical end position, said method comprising the steps of:

a) determining a position of the window or the sunroof relative to said mechanical end position;

b) measuring a time difference between two incremental pulses when said position of said window or said sunroof is within a predetermined distance from said mechanical end position; and c) calculating said remaining running time of the electric drive mechanism for reaching said mechanical end position from said time difference.

2. The method according to claim 1, wherein the actual position of the mechanical limit stop is determined in one or more reference runs.

3. The method according to claim 1, wherein the result for the remaining running time (26) determined in the calculation is combined with an additional factor dependent on an actual measuring position.

4. The method according to claim 3, wherein the additional factor is varied depending on system-related parameters.

5. The method according to claim 3, wherein, by means of the additional factor, a depth of immersion of a closing surface in a mechanical limit stop enclosing it can be adjusted.

6. The method according to claim 5, wherein the depth of immersion depends on a system parameter of a motor voltage of the electrical drive mechanism.

7. The method according to claim 1, wherein, after a first determination of the remaining time (26), the corresponding remaining running time (26) is determined at each new position (25) and can be used as a plausibility check.

8. The method according to claim 3, wherein the additional factor is determined empirically at a closing system, or in reference runs, in the mechanical limit stop for the window or sunroof to be closed.

9. The method according to claim 1, wherein, after the calculated remaining running time (26) elapses, a drive motor of the electrical drive mechanism is shut down.

10. The method according to claim 1, further comprising the step of detecting the position of the window or sunroof to be closed relative to a mechanical limit stop.

* * * * *